United States Patent
Wu et al.

(10) Patent No.: US 9,398,170 B2
(45) Date of Patent: Jul. 19, 2016

(54) METHOD, APPARATUS, AND SYSTEM FOR PROCESSING CHARGING INFORMATION

(71) Applicant: Huawei Technologies Co., Ltd., Shenzhen (CN)

(72) Inventors: Xiaobo Wu, Shenzhen (CN); Lin Shu, Shenzhen (CN); Wanqiang Zhang, Shenzhen (CN); Shufeng Shi, Shenzhen (CN); Weisheng Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/604,049

(22) Filed: Jan. 23, 2015

(65) Prior Publication Data

US 2015/0140963 A1 May 21, 2015

Related U.S. Application Data

(63) Continuation of application No. PCT/CN2012/079042, filed on Jul. 23, 2012.

(51) Int. Cl.
*H04M 15/00* (2006.01)
*H04L 12/14* (2006.01)
*H04M 15/06* (2006.01)

(52) U.S. Cl.
CPC ............ *H04M 15/73* (2013.01); *H04L 12/1482* (2013.01); *H04M 15/06* (2013.01); *H04M 15/41* (2013.01); *H04M 15/58* (2013.01); *H04M 15/755* (2013.01); *H04M 15/8038* (2013.01)

(58) Field of Classification Search
CPC ....... H04W 48/16; H04W 4/24; G06Q 20/14; H04L 41/08; G06F 3/0482; H04M 15/41; H04M 15/73; H04M 15/58; H04M 15/755
USPC .............. 455/435.1, 414.1, 456.1, 432.1; 709/230; 705/14; 370/241, 401
See application file for complete search history.

(56) References Cited

U.S. PATENT DOCUMENTS

| | | | | |
|---|---|---|---|---|
| 2005/0107083 | A1* | 5/2005 | Rager | H04W 48/16 455/435.1 |
| 2007/0124490 | A1* | 5/2007 | Kalavade | G06Q 20/14 709/230 |
| 2009/0291666 | A1 | 11/2009 | Rydnell et al. | |

FOREIGN PATENT DOCUMENTS

| | | |
|---|---|---|
| CN | 101336001 A | 12/2008 |
| CN | 101479989 A | 7/2009 |
| CN | 102026136 A | 4/2011 |

OTHER PUBLICATIONS

"3$^{rd}$ Generation Partnership Project; Technical Specification Group Services and System Aspects; Telecommunication management; Charging management; Charging Data Record(CDR)parameter description(Release 11)," 3GPP TS 32.298, V11.3.0, 3$^{rd}$ Generation Partnership Project, Valbonne, France (Jun. 2012).

(Continued)

*Primary Examiner* — Phuoc H Doan
(74) *Attorney, Agent, or Firm* — Leydig, Voit & Mayer, Ltd.

(57) ABSTRACT

Embodiments of the present invention provide a method, an apparatus and a system for processing charging information, wherein the method includes: a mobility management device acquires a PLMN identifier corresponding to a network name displayed by a user equipment; transmits the PLMN identifier corresponding to the network name displayed by the user equipment to a call detail record information generating device, so that user call detail record information generated by the call detail record information generating device includes the PLMN identifier corresponding to the network name displayed by the user equipment; therefore, a charging device can charge the user according to the network name displayed by the UE included in the user call detail record information generated by the call detail record information generating device, thereby ensuring accuracy of the charging the user, and enhancing user experience.

13 Claims, 3 Drawing Sheets

Acquiring a public land mobile network PLMN identifier corresponding to a network name displayed by a user equipment included in user call detail record information, according to the user call detail record information — 301

Generating a corresponding user call detail record fee, according to a charging rate of the PLMN identifier corresponding to the network name displayed by the user equipment — 302

(56) References Cited

OTHER PUBLICATIONS

"3rd Generation Partnership Project; Technical Specification Group Core Network and Terminals; Non-Access-Stratum(NAS)Protocol for Evolved Packet System(EPS); Stage 3(Release 11)," 3GPP TS 24.301, V11.3.0, 3rd Generation Partnership Project, Valbonne, France (Jun. 2012).

"3rd Generation Partnership Project; Technical Specification Group Services and System Aspects; General Packet Radio Service(GPRS)enhancements for Evolved Universal Terrestrial Radio Access Network(E-UTRAN)access(Release 11)," 3GPP TS 23.401, V11.2.0, 3rd Generation Partnership Project, Valbonne, France (Jun. 2012).

"3rd Generation Partnership Project; Technical Specification Group Services and System Aspects; Circuit Switched(CS)fallback in Evolved Packet System(EPS);Stage 2 (Release 11)," 3GPP TS 23.272, V11.1.0, 3rd Generation Partnership Project, Valbonne, France (Jun. 2012).

"3rd Generation Partnership Project; Technical Specification Group Services and System Aspects; Network Sharing; Architecture and functional description(Release 11)," 3GPP TS 23.251, V11.2.0, 3rd Generation Partnership Project, Valbonne, France (Jun. 2012).

"3rd Generation Partnership Project; Technical Specification Group Core Network and Terminals; 3GPP Evolved Packet System(EPS); Evolved General Packet Radio Service (GPRS)Tunnelling Protocol for Control plane(GTPv2-C); Stage 3(Release 11)," 3GPP TS 29.274, V11.3.0, 3rd Generation Partnership Project, Valbonne, France (Jun. 2012).

"3rd Generation Partnership Project; Technical Specification Group Services and System Aspects; Intra-domain connection of Radio Access Network(RAN)nodes to multiple Core Network(CN-)nodes(Release 10)," 3GPP TS 23.236, V10.3.0, 3rd Generation Partnership Project, Valbonne, France (Mar. 2012).

"3rd Generation Partnership Project; Technical Specification Group Core Network and Terminals; Mobility Management Entity (MME); Visitor Location Register(VLR)SGs interface specification(Release 11)," 3GPP TS 29.118, V11.3.0, 3rd Generation Partnership Project, Valbonne, France (Jun. 2012).

\* cited by examiner

METHOD, APPARATUS, AND SYSTEM FOR
PROCESSING CHARGING INFORMATION

CROSS-REFERENCE TO RELATED
APPLICATIONS

This application is a continuation of International Patent Application No. PCT/CN2012/079042, filed on Jul. 23, 2012, which is hereby incorporated by reference in its entirety.

TECHNICAL FIELD

The present invention relates to the wireless network communication technology, and more particularly to a method, an apparatus and a system for processing charging information.

BACKGROUND

In order to reduce costs of an operator for deploying a radio access network, the 3GPP proposes an idea of network sharing, that is, a public land mobile network (Public Land Mobile Network, PLMN) of multiple operators, or multiple PLMNs of one operator can share the same radio access network to provide a wireless communication service. For example, the 3GPP proposes a circuit domain fallback (CS Fallback, CSFB) technology and SGs short message service transmission (SMS over SGs) technology.

The CSFB technology will be taken herein as an example, the UE performs joint attachment in a long term evolution (Long Term Evolution, LTE) network with a PLMN identifier of 46000, and an LTE network service is provided for the UE by an operator of the LTE network, which is shown as the China Mobile by the UE according to the PLMN identifier of 46000. When the UE returns to CS domain of 2G/3G network to complete voice service processing via the E-UTRAN provided by the LTE network operator of the China Mobile, it is assumed that the PLMN identifier of the 2G/3G operator network shared by the UE is 46001 (the PLMN identifier of the China Unicom), and user call detail record information generated by a mobile-services switching centre (Mobile-services Switching Centre, MSC) or a visitors location register (Visitors Location Register, VLR) only carries the PLMN identifier of the current serving network (the PLMN identifier of the China Unicom is 46001), a charging device charges the user according to a charging rate corresponding to the PLMN identifier of the China Unicom, thus a situation may occur that the network name displayed by the UE is the China Mobile but the charging system charges the UE according to a charging method of the China Unicom.

Therefore, when a radio access network is shared, the charging the user by the charging device based on the call detail record information which is generated by the existing call detail record information generating device may be incorrect.

SUMMARY

Accordingly, embodiments of the present invention provide a method, an apparatus and a system for processing charging information, capable of improving accuracy of the charging the user.

One aspect of the present invention provides a method for processing charging information, including:

acquiring, by a mobility management device, a public land mobile network PLMN identifier corresponding to a network name displayed by a user equipment;

transmitting the PLMN identifier corresponding to the network name displayed by the user equipment to a call detail record information generating device, so that user call detail record information generated by the call detail record information generating device comprises the PLMN identifier corresponding to the network name displayed by the user equipment.

In a first possible implementation, the mobility management device acquires the PLMN identifier corresponding to the network name displayed by the user equipment, which specifically is: the mobility management device determines the PLMN identifier carried in mobility management information transmitted to the UE as the PLMN identifier corresponding to the network name displayed by the user equipment; or the mobility management device determines, according to a network name configured by the UE, a PLMN identifier corresponding to the network name, and determines the PLMN identifier corresponding to the network name as the PLMN identifier corresponding to the network name displayed by the user equipment.

In a second possible implementation by combining the first implementation, the transmitting the PLMN identifier corresponding to the network name displayed by the user equipment to the call detail record information generating device specifically is: the mobility management device transmits a request message comprising the PLMN identifier corresponding to the network name displayed by the user equipment, to the call detail record information generating device.

One aspect of the present invention provides another method for processing charging information, including:

receiving, by a call detail record information generating device, a public land mobile network PLMN identifier corresponding to a network name displayed by a user equipment;

generating user call detail record information, according to the PLMN identifier corresponding to the network name displayed by the user equipment, wherein the user call detail record information comprises the PLMN identifier corresponding to the network name displayed by the user equipment.

In a first possible implementation, the call detail record information generating device receives the PLMN identifier corresponding to the network name displayed by the user equipment, which specifically is: the call detail record information generating device receives a request message including the PLMN identifier corresponding to the network name displayed by the user equipment, transmitted by the mobility management device.

In a second possible implementation by combining the first possible implementation, the generating the user call detail record information, according to the PLMN identifier corresponding to the network name displayed by the user equipment, specifically is: the call detail record information generating device generates user call detail record information including the PLMN identifier corresponding to the network name displayed by the user equipment, according to the PLMN identifier corresponding to the network name displayed by the user equipment.

One aspect of the present invention provides a mobility management device, including:

a first acquiring module, configured to acquire a public land mobile network PLMN identifier corresponding to a network name displayed by a user equipment;

a transmitting module, configured to transmit the PLMN identifier corresponding to the network name displayed by the user equipment, acquired by the first acquiring module, to a call detail record information generating device, so that user call detail record information generated by the call detail record information generating device comprises the PLMN identifier corresponding to the network name displayed by the user equipment.

One aspect of the present invention provides a call detail record information generating device, including:

a receiving module, configured to receive a public land mobile network PLMN identifier corresponding to a network name displayed by a user equipment;

a user call detail record information generating module, configured to generate user call detail record information comprising the PLMN identifier corresponding to the network name displayed by the user equipment, according to the PLMN identifier corresponding to the network name displayed by the user equipment received by the receiving module.

One aspect of the present invention provides another method for processing charging information, including:

acquiring a public land mobile network PLMN identifier corresponding to a network name displayed by a user equipment included in user call detail record information, according to the user call detail record information;

generating a corresponding user call detail record fee, according to a charging rate of the PLMN identifier corresponding to the network name displayed by the user equipment.

In a first possible implementation, the user call detail record information further includes a PLMN identifier of a current serving network;

In a second possible implementation by combining the first possible implementation, the specific implementation is:

generating a corresponding user call detail record fee, according to a charging rate of the PLMN identifier of the current serving network, if the charging rate of the PLMN identifier corresponding to the network name displayed by the user equipment is determined to be greater than the charging rate of the PLMN identifier of the current serving network;

generate a corresponding user call detail record fee, according to the charging rate of the PLMN identifier corresponding to the network name displayed by the user equipment, if the charging rate of the PLMN identifier corresponding to the network name displayed by the user equipment is determined to be less than the charging rate of the PLMN identifier of the current serving network.

In a third possible implementation by combining the first and the second possible implementations, the user call detail record information further includes a third PLMN identifier, the user call detail record information further includes a PLMN identifier of a packet data network gateway PGW or a gateway general packet radio service support node GGSN; the specific implementation is:

performing inter-network fee settlement among a network of the PLMN identifier corresponding to the network name displayed by the user equipment, the current serving network and a network of the PLMN identifier of the PGW or the GGSN, according to the PLMN identifier corresponding to the network name displayed by the user equipment, the PLMN identifier of the current serving network and the PLMN identifier of the PGW or the GGSN.

One aspect of the present invention provides a charging device, including:

a second acquiring module, configured to acquire a public land mobile network PLMN identifier corresponding to a network name displayed by a user equipment carried in user call detail record information, according to the user call detail record information;

a user call detail record fee generating module, configured to generate corresponding user call detail record fee, according to a charging rate of the PLMN identifier corresponding to the network name displayed by the user equipment, acquired by the second acquiring module.

One aspect of the present invention provides a system for processing charging information, including the mobility management device, the call detail record information generating device and the charging device as described above.

In embodiments of the present invention, the mobility management device transmits the PLMN identifier corresponding to the network name displayed by the UE to the call detail record information generating device, so that user call detail record information generated by the call detail record information generating device includes the PLMN identifier corresponding to the network name displayed by the UE. Meanwhile, the user call detail record information is transmitted to the charging device, so that the charging device charges the user according to the PLMN identifier corresponding to the network name displayed by the user equipment, solving the problem that the call detail record information, generated by the existing call detail record information generating device, does not include the PLMN identifier corresponding to the network name displayed by the UE when a radio access network is shared, and thus the charging the user by the charging device may be incorrect, in this embodiment, charging the user can be achieved according to the network name displayed by the UE, thereby ensuring accuracy of the charging the user, and enhancing user experience.

BRIEF DESCRIPTION OF DRAWINGS

In order to illustrate embodiments of the present invention or the technical solution in the prior art more clearly, accompanying drawings needed for describing the embodiments or the prior art will be introduced in brief hereinafter. Apparently, the accompanying drawings described below show certain embodiments of the present invention, and persons skilled in the art can derive other drawings from them without creative efforts.

DESCRIPTION OF EMBODIMENTS

In order to make the objects, technical solutions, and advantages of embodiments of the present invention clearer, the technical solutions in the embodiments of the present invention are hereinafter described clearly and completely with reference to the accompanying drawings in the embodiments of the present invention. Obviously, the embodiments described here are part of the embodiments of the present invention and not all of the embodiments. All other embodiments obtained by persons skilled in the art on the basis of the embodiments of the present invention without any creative efforts all fall within the protection scope of the present invention.

Figure 1:
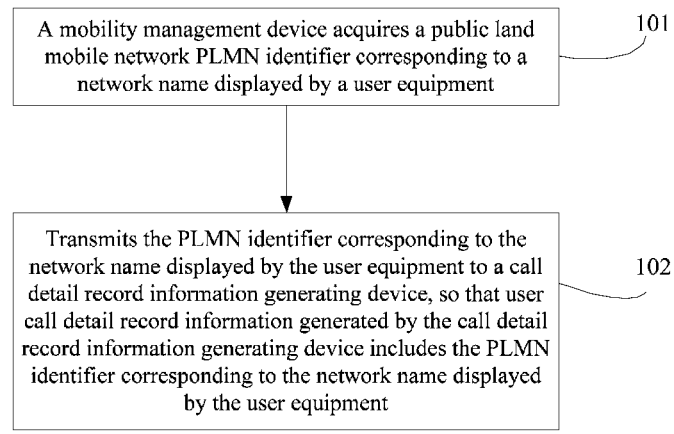
FIG. 1 is a schematic flowchart of a method for processing charging information according to an embodiment of the present invention.

FIG. 1 is a schematic flowchart of a method for processing charging information according to an embodiment of the present invention, as shown in FIG. 1, the charging method in this embodiment can include:

101, A mobility management device acquires a public land mobile network PLMN identifier corresponding to a network name displayed by a user equipment.

For example, the UE shall display a registered network name to a user after being successfully registered to an operator's network, and the network name displayed by the UE can be displayed according to a network name transmitted by the MME or a configuration of the UE itself.

In an optional implementation of this embodiment, the MME transmits an LTE PLMN identifier or a CS PLMN identifier to the UE by carrying the corresponding network name thereof in mobility management information, and the UE displays to the user according to the received network name. Particularly, the PLMN identifier corresponding to the network name displayed by the user equipment is a PLMN identifier (i.e., LTE PLMN ID) of a PS network which the MME belongs to, or the PLMN identifier corresponding to the network name displayed by the user equipment is a PLMN identifier (i.e., CS PLMN ID) of a CS network registered by the MME via MSC/VLR.

The MME can determine the PLMN identifier as the PLMN identifier corresponding to the network name displayed by the UE, according to the PLMN identifier corresponding to the network name carried in the mobility management information transmitted to the UE. Or the MME does not transmit the mobility management information to the UE, the UE displays the network name according to the configuration itself, and then the MME also determines the PLMN identifier corresponding to the network name as the PLMN identifier corresponding to the network name displayed by the UE according to the network name configured by the UE.

102, Transmits the PLMN identifier corresponding to the network name displayed by the user equipment to a call detail record information generating device, so that user call detail record information generated by the call detail record information generating device includes the PLMN identifier corresponding to the network name displayed by the user equipment.

In the prior art, for example, when the UE performs joint attachment or tracking area update (Tracking Area Update, TAU) process in the LTE network, the MME only carries a PLMN identifier of a service node (i.e., a PLMN identifier of the current serving network) in a create session request Create Session Request message or a modify bearer request Modify Bearer Request or other request message, and in a case that the PLMN identifier of the current serving network and the PLMN identifier corresponding to the network name displayed by the user equipment are the same, the call detail record information generating device generates the user call detail record information according to the PLMN identifier of the current serving network, and thus accuracy of the charging the user can be guaranteed.

However, in a case that the PLMN identifier of the current serving network and the PLMN identifier corresponding to the network name displayed by the user equipment are different, the user is charged by a network charging method corresponding to the PLMN identifier of the current serving network, and thus the charging the user may be incorrect, that is, the charging device considers that the network name currently displayed by the user equipment is based on the PLMN identifier of the current serving network.

The mobility management device in embodiments of the present invention can transmit the PLMN identifier corresponding to the network name displayed by the user equipment to the call detail record information generating device, so that the call detail record information generating device generates user the call detail record information including the PLMN identifier corresponding to the network name displayed by the user equipment.

The mobility management device transmits the PLMN identifier corresponding to the network name displayed by the user equipment to the call detail record information generating device, in an optional implementation of this embodiment, the mobility management device transmits a request message including the PLMN identifier corresponding to the network name displayed by the user equipment, to the call detail record information generating device; the request message includes, but not limited to, a location update request message, a service request message, a create session request message or a modify bearer request.

For example, when the UE performs joint attachment/joint location update on the CSFB, the MME can carry the PLMN identifier corresponding to the network name displayed by the user equipment in a location update request Location Update Request transmitted to the MSC/VLR;

For another example, when the UE is called via voice on the CSFB, the MME can carry the PLMN identifier corresponding to the network name displayed by the user equipment in a service request message Service Request transmitted to the MSC VLR;

For another example, when the UE calls via voice on the CSFB, the MME can carry the PLMN identifier corresponding to the network name displayed by the user equipment in a service request message Service Request or other request message transmitted to the MSC VLR;

For another example, when the UE calls and is called via short message on the CSFB, the MME can carry the PLMN identifier corresponding to the network name displayed by the user equipment in uplink unit data Uplink Unitdata or a service request message Service Request transmitted to the MSC VLR.

For another example, when the UE performs joint attachment or joint location update on the LTE network, the MME can carry the PLMN identifier corresponding to the network name displayed by the user equipment in a create session request message Create Session Request or a modify bearer request Modify Bearer Request or other request message transmitted to the SGW; the SGW transmits the create session request message Create Session Request or the modify bearer request Modify Bearer Request or other request message carrying the PLMN identifier corresponding to the network name displayed by the user equipment to the PGW;

For another example, when the UE performs VoIP voice service on the LTE network, if the voice service is switched to other PS domain, such as high speed uplink packet access (High Speed Uplink Packet Access, HSUPA) technology, the handover message transmitted by the MME to the SGSN carries the PLMN identifier corresponding to the network name displayed by the user equipment, and the create session request message Create Session Request or the modify bearer request Modify Bearer Request or other request message transmitted by the SGSN to the SGW/PGW or GGSN carries the PLMN identifier corresponding to the network name displayed by the user equipment.

For another example, when the UE performs the VoIP voice service on the 3G network (such as HSUPA network), handover (Handover, HO) of LTE packet switched (Packet Switched, PS) is performed to switch to the LTE, during the handover, the MME identifies the VoIP service, and the create session request message Create Session Request or the modify bearer request Modify Bearer Request or other request message transmitted to the SGW carries the PLMN identifier corresponding to the network name displayed by the user equipment. The PLMN identifier corresponding to the network name displayed by the user equipment is a PLMN ID corresponding to the 3G network, and the SGW transmits the create session request message Create Session Request or the modify bearer request Modify Bearer Request or other request message carrying the PLMN identifier corresponding to the network name displayed by the user equipment to the PGW.

For another example, when the UE performs the VoIP voice service on the LTE network, single radio voice call continuity (Single Radio Voice Call Continuity, SRVCC) is switched to 2/3G CS domain, the PLMN identifier corresponding to the network name displayed by the user equipment can be carried in PS to CS handover message transmitted by SGSN/MME to MSC VLR.

For another example, when the UE performs CS voice service on the 2/3G network, the user judges a network which the UE is currently stationed or serves for the UE according to the network name displayed by the UE. When a voice service contact is performed, it is necessary to perform reverse single radio voice call continuity (Reverse Single Radio Voice Call Continuity, SRVCC), the UE is switched to the LTE or 3G (HSPA) network, the PLMN identifier corresponding to the network name displayed by the user equipment can be carried in CS to PS handover message transmitted by the MSC VLR to SGSN/MME.

For another example, when the UE performs CS voice service on the 2/3G network, the user judges a network which the UE is currently stationed or serves for the UE according to the network name currently displayed by the UE, and at this time, the network name displayed by the UE can be a network name of the 2/3G network. When a voice service contact is performed, it is necessary to perform circuit domain handover (CS Handover), the UE is switched to another 2/3G network, and the PLMN identifier corresponding to the network name displayed by the user equipment is carried in CS to CS handover message transmitted by the MSC VLR to MSC VLR.

It should be noted that, the request message transmitted by the mobility management device to the call detail record information generating device carries the PLMN identifier corresponding to the network name displayed by the user equipment, and the specific implementation thereof is: the request message is added with a new information unit, which is exclusively for storing the PLMN identifier corresponding to the network name displayed by the user equipment, or the PLMN identifier of the service node carried in the existing request message is modified to the PLMN identifier corresponding to the network name displayed by the user equipment.

In an optional implementation of this embodiment, the mobility management device can transmit separately PLMN identifier information including the PLMN identifier corresponding to the network name displayed by the user equipment to the call detail record information generating device.

Correspondingly, the call detail record information generating device determines, according to the PLMN identifier corresponding to the network name displayed by the user equipment carried in the received request message, that the MME indicates the UE to display the network name based on the PLMN identifier; MSC VLR/SGW/PGW/SGSN/GGSN generates user call detail record information including the PLMN identifier corresponding to the network name displayed by the user equipment, according to the PLMN identifier corresponding to the network name displayed by the user equipment, and transmits the user call detail record information to the charging device, so that the charging device generates user call detail record fee according to the PLMN identifier corresponding to the network name displayed by the user equipment included in the user call detail record information.

It should be noted that, the above call detail record information generating device can include, but is not limited to, a mobile switching center/visitor location register (Mobile Switching Center/Visitor Location Register, MSC/VLR), a serving gateway/packet data network gateway (Service Gateway/Packet Data Net Gateway, SGW/PGW), a serving GPRS support node (Serving GPRS Support Node, SGSN), a general packet radio service support node (Gateway GPRS Support Node, GGSN), and particularly, the MSC/VLR can be MSC/VLR of a single radio voice call continuity (Single Radio Voice Call Continuity, SRVCC), or can be MSC/VLR of CSFB.

It should be noted that, in the process of the CSFB service, the MME in this embodiment also can generate user call detail record information including the PLMN identifier corresponding to the network name displayed by the user equipment, and transmits the user call detail record information to the charging device, so that the charging device charges the user according to the PLMN identifier corresponding to the network name displayed by the user equipment. In this case, the MME can transmit the PLMN identifier corresponding to the network name displayed by the user equipment to the MSC VLR through carrying it in the request message, or transmit the PLMN identifier corresponding to the network name displayed by the user equipment to the MSC VLR not through carrying it in the request message. The CSFB service includes CSFB voice service, CSFB location control service (Location Control Service, LCS), CSFB call independent supplementary service (Call Independent Supplementary Service, CISS) and CSFB short message service.

The mobility management device in embodiments of the present invention transmits the PLMN identifier corresponding to the network name displayed by the UE to the call detail record information generating device, so that user call detail record information generated by the call detail record information generating device includes the PLMN identifier corresponding to the network name displayed by the UE, and transmits the user call detail record information to the charging device, so that according to the PLMN identifier corresponding to the network name displayed by the UE, the charging device can generate the user call detail record according to the network name displayed by the UE included in the user call detail record information generated by the call detail record information generating device, solving the problem that, the call detail record information generated by the existing call detail record information generating device does not include the PLMN identifier corresponding to the network name displayed by the UE when a radio access network is shared, and thus the charging the user by the charging device may be incorrect, and thereby ensuring the accuracy of the charging the user, and enhancing user experience.

Figure 2:
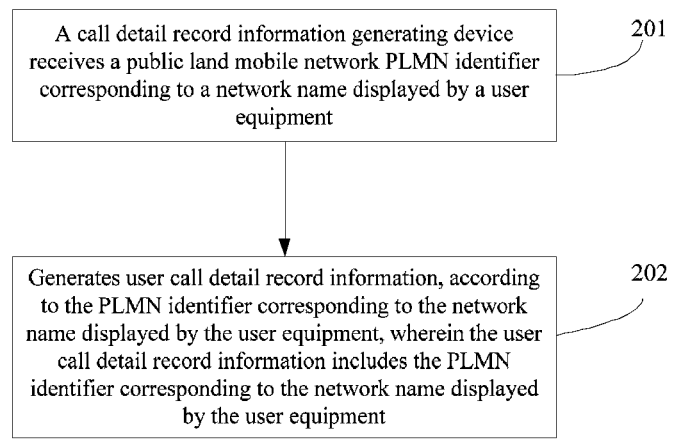
FIG. 2 is a schematic flowchart of a method for processing charging information according to another embodiment of the present invention.

FIG. 2 is a schematic flowchart of a method for processing charging information according to another embodiment of the present invention; as shown in FIG. 2, the method includes:

201, A call detail record information generating device receives a public land mobile network PLMN identifier corresponding to a network name displayed by a user equipment.

In an optional implementation of this embodiment, the call detail record information generating device receives a request message including the PLMN identifier corresponding to the network name displayed by the user equipment, transmitted by a mobility management device, and it should be noted that the request message includes, but not limited to, a location update request message, a service request message, a create session request message or a modify bearer request. Specific implementation can refer to relevant description on Step 102 in the embodiment with reference to FIG. 1 for details, and accordingly is not described further herein.

In an optional implementation of this embodiment, the call detail record information generating device can transmit to the mobility management device a request message for acquiring the PLMN identifier corresponding to the network name displayed by the user equipment; receive a response message including the PLMN identifier corresponding to the network name displayed by the user equipment, returned by the mobility management device.

It should be noted that, the call detail record information generating device in this embodiment can include, but is not limited to, MSC VLR/SGW/PGW/SGSN/SRVCC MSC VLR/GGSN/MME. The MSC VLR can be CSFB MSC VLR or SRVCC MSC VLR.

It should be noted that, in the process of the CSFB service, the MME also can generate user call detail record information including the PLMN identifier corresponding to the network name displayed by the user equipment, and transmits the user call detail record information to the charging device, so that the charging device charges the user according to the PLMN identifier corresponding to the network name displayed by the user equipment. In this case, the MME can transmit the PLMN identifier corresponding to the network name displayed by the user equipment to the MSC VLR through carrying it in the request message, or transmit the PLMN identifier corresponding to the network name displayed by the user equipment to the MSC VLR not through carrying it in the request message. The CSFB service includes CSFB voice service, CSFB location (Location Control Service, LCS) service, CSFB call independent supplementary (Call Independent Supplementary Service, CISS) service and CSFB short message service. In particular, the CSFB in this embodiment includes LTE->2/3G CSFB and LTE->1×RTT (1×single-carrier radio transmission technology (Single-carrier Radio Transmission Technology)) CSFB.

202, Generates user call detail record information, according to the PLMN identifier corresponding to the network name displayed by the user equipment, wherein the user call detail record information includes the PLMN identifier corresponding to the network name displayed by the user equipment.

The call detail record information generating device generates user call detail record information according to the PLMN identifier corresponding to the network name displayed by the user equipment, which particularly is: the call detail record information generating device can generate new user call detail record information including the PLMN identifier corresponding to the network name displayed by the user equipment; or the call detail record information generating device can add a new information unit into existing call detail record information for storing the PLMN identifier corresponding to the network name displayed by the user equipment, wherein the PLMN identifier corresponding to the network name displayed by the user equipment is the PLMN identifier corresponding to the network name displayed by the user equipment carried in the request message transmitted by the mobility management device to the call detail record information generating device.

It should be noted that, in a practical application, the user call detail record information generated by the call detail record information generating device further includes a PLMN identifier of the current serving network and a PLMN identifier of PGW/GGSN, in addition to the PLMN identifier corresponding to the network name displayed by the user equipment.

In an optional implementation of the present invention, the call detail record information generating device can transmit the generated user call detail record information to a charging device, or the call detail record information generating device can transmit the generated user call detail record information to the charging device, after a request message for acquiring the user call detail record information transmitted by the charging device; correspondingly, the charging device determines that the mobility management device indicates the UE to display the network name corresponding to the PLMN identifier based on the PLMN identifier, according to the PLMN identifier corresponding to the network name displayed by the user equipment included in the user call detail record information, and thus generates user call detail record fee according to the PLMN identifier corresponding to the network name displayed by a first user equipment. Further, the charging device also can perform inter-network fee settlement among different network operators, according to the PLMN identifier corresponding to the network name displayed by the first user equipment, the PLMN identifier of the current serving network and the PLMN identifier of PGW/GGSN.

The call detail record information generating device in this embodiment adds the PLMN identifier corresponding to the network name displayed by the UE to the user call detail record information, and transmits the user call detail record information to the charging device, so that the charging device generates the call detail record according to the PLMN identifier corresponding to the network name displayed by the UE, and charging the user can be achieved according to the network name displayed by the UE, solving the problem that, the call detail record information generated by the existing call detail record information generating device does not include the PLMN identifier corresponding to the network name displayed by the UE when a radio access network is shared, and thus the charging the user by the charging device may be incorrect, and thereby ensuring accuracy of the charging the user, and enhancing user experience.

Figure 3:
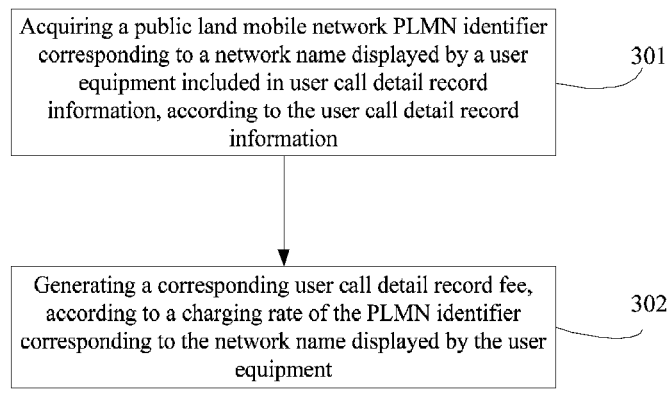
FIG. 3 is a schematic flowchart of a method for processing charging information according to another embodiment of the present invention.

FIG. 3 is a schematic flowchart of a method for processing charging information according to another embodiment of the present invention; as shown in FIG. 3, the method includes:

301, Acquiring a public land mobile network PLMN identifier corresponding to a network name displayed by a user equipment included in user call detail record information, according to the user call detail record information.

In an optional implementation of the present invention, the call detail record information generating device can transmit the generated user call detail record information to a charging device, or the charging device can transmit a request message for acquiring the user call detail record information to the call detail record information generating device, and the call detail record information generating device transmits the generated user call detail record information to the charging device.

302, Generating a corresponding user call detail record fee, according to a charging rate of the PLMN identifier corresponding to the network name displayed by the user equipment.

It should be noted that, in a practical application, the user call detail record information generated by the call detail record information generating device further includes a PLMN identifier of the current serving network, in addition to the PLMN identifier corresponding to the network name displayed by the user equipment.

Further, in order to reduce communication cost of the user, and improve user experience, if a charging rate of the PLMN identifier corresponding to the network name displayed by the user equipment is determined by the charging device in this embodiment to be greater than a charging rate of the PLMN identifier of the current serving network, then a corresponding user call detail record fee is generated according to the charging rate of the PLMN identifier of the current serving network; if a charging rate of the PLMN identifier corresponding to the network name displayed by the user equipment is determined to be less than the charging rate of the PLMN identifier of the current serving network, then the corresponding user call detail record fee is generated, according to the charging rate of the PLMN identifier corresponding to the network name displayed by the user equipment.

It should be noted that, in a practical application, the user call detail record information generated by the call detail record information generating device further includes a PLMN identifier of PGW/GGSN, in addition to the PLMN identifier corresponding to the network name displayed by the user equipment and the PLMN identifier of the current serving network.

Further, the charging device also can perform inter-network fee settlement among different network operators, according to the PLMN identifier corresponding to the network name displayed by the user equipment, the PLMN identifier of the current serving network and the PLMN identifier of PGW/GGSN, in the specific implementation, for example, a user's home operator (Home PLMN, HPLMN) can respectively pay an operator of the PLMN corresponding to the network name displayed by the user equipment, an operator of the current serving network and an operator of the PLMN of PGW/GGSN, or the user's home operator (HPLMN) pays the operator of the PLMN corresponding to the network name displayed by the user equipment, and then the operator of the PLMN corresponding to the network name displayed by the user equipment respectively pays the operator of the current serving network and the operator of the PLMN of PGW/GGSN.

The charging device in this embodiment can charge the UE, according to the PLMN identifier corresponding to the network name displayed by the UE, carried in the call detail record information, and charging the user can be achieved according to the network name displayed by the UE, thereby ensuring accuracy of the charging the user, and enhancing user experience.

Further, the charging device in this embodiment also can charge the user according to the charging rate of the current serving network based on the PLMN identifier of the current serving network carried in the call detail record information, if the charging rate of the current serving network is determined to be less than the charging rate of the network displayed by the UE, thereby achieving charging the user in a low charging rate and improving user experience;

Further, the charging device in this embodiment also can perform inter-network fee settlement among different network operators, according to the PLMN identifier corresponding to the network name displayed by the UE, the PLMN identifier of the current serving network and the PLMN identifier of PGW/GGSN, carried in the call detail record information, improving accuracy of the inter-network fee settlement among different network operators.

Figure 4:
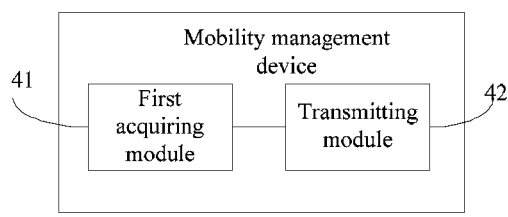
FIG. 4 is a schematic structural diagram of a mobility management device according to another embodiment of the present invention.

FIG. 4 is a schematic structural diagram of a mobility management device according to another embodiment of the present invention; as shown in FIG. 4, the device includes:

a first acquiring module 41, configured to acquire a public land mobile network PLMN identifier corresponding to a network name displayed by a user equipment;

a transmitting module 42, configured to transmit the PLMN identifier corresponding to the network name displayed by the user equipment, acquired by the first acquiring module, to a call detail record information generating device, so that user call detail record information generated by the call detail record information generating device comprises the PLMN identifier corresponding to the network name displayed by the user equipment.

In an optional implementation of this embodiment, the first acquiring module 41 is specifically configured to determine the PLMN identifier carried in mobility management information transmitted to the UE as the PLMN identifier corresponding to the network name displayed by the user equipment; or determine, according to a network name configured by the UE, the PLMN identifier corresponding to the network name, and determine the PLMN identifier corresponding to the network name as the PLMN identifier corresponding to the network name displayed by the user equipment.

In an optional implementation of this embodiment, the transmitting module 42 is specifically configured to:

transmit a request message comprising the PLMN identifier corresponding to the network name displayed by the user equipment, to the call detail record information generating device.

It should be noted that, the request message transmitted by the transmitting module 42 includes at least one of a location update request message, a service request message, a create session request message or a modify bearer request, and the detailed description can be referred to relevant contents in the embodiment with reference to FIG. 1 for details.

It should be noted that, the mobility management device in this embodiment includes at least one of MME or SGSN.

The mobility management device in this embodiment transmits the PLMN identifier corresponding to the network name displayed by the UE to the call detail record information generating device, so that user call detail record information generated by the call detail record information generating device includes the PLMN identifier corresponding to the network name displayed by the UE, and transmits the user call detail record information to the charging device, so that the charging device can charge the user according to the PLMN identifier corresponding to the network name displayed by the UE, solving the problem that the call detail record information, generated by the existing call detail record information generating device, does not include the PLMN identifier corresponding to the network name displayed by the UE when a radio access network is shared, and thus the charging the user by the charging device may be incorrect, and thereby ensuring accuracy of the charging the user, and enhancing user experience.

Figure 5:
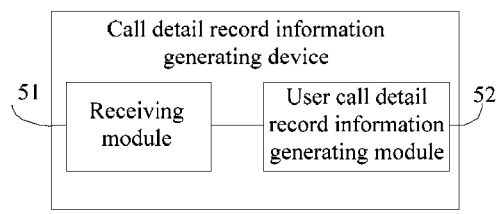
FIG. 5 is a schematic structural diagram of a call detail record information generating device according to another embodiment of the present invention.

FIG. 5 is a schematic structural diagram of a call detail record information generating device according to another embodiment of the present invention; as shown in FIG. 5, the device includes:

a receiving module 51, configured to receive a public land mobile network PLMN identifier corresponding to a network name displayed by a user equipment;

a user call detail record information generating module 52, configured to generate user call detail record information including the PLMN identifier corresponding to the network name displayed by the user equipment, according to the PLMN identifier corresponding to the network name displayed by the user equipment, received by the receiving module.

In an optional implementation of this embodiment, the receiving module 51 is specifically configured to receive a request message including the PLMN identifier corresponding to the network name displayed by the user equipment, transmitted by a mobility management device.

It should be noted that, the user call detail record information generating module 52 can generate new user call detail record information including the PLMN identifier corresponding to the network name displayed by the user equipment; or the user call detail record information generating module 52 can add a new information unit into existing user call detail record information for storing the PLMN identifier corresponding to the network name displayed by the user equipment, wherein the PLMN identifier corresponding to the network name displayed by the user equipment is the PLMN identifier corresponding to the network name displayed by the user equipment carried in the request message transmitted by the mobility management device to the call detail record information generating device.

It should be noted that, the call detail record information generating device in this embodiment includes at least one of a mobile service switching center server MSC Server, a serving general packet radio service support node SGSN, a gateway general packet radio service support node GGSN, a serving gateway SGW, a packet data network gateway PGW or a mobility management entity MME, and the detailed description can be referred to relevant description in the embodiment with reference to FIG. 2 for details.

The call detail record information generating device in this embodiment adds the PLMN identifier corresponding to the network name displayed by the UE to the user call detail record information, and transmits the user call detail record information to the charging device, so that the charging device charges the user according to the PLMN identifier corresponding to the network name displayed by the UE, and charging the user can be achieved according to the network name displayed by the UE, solving the problem that, the call detail record information generated by the existing call detail record information generating device does not include the PLMN identifier corresponding to the network name displayed by the UE when a radio access network is shared and thus the charging the user by the charging device may be incorrect, and thereby ensuring accuracy of the charging the user, and enhancing user experience.

Figure 6:
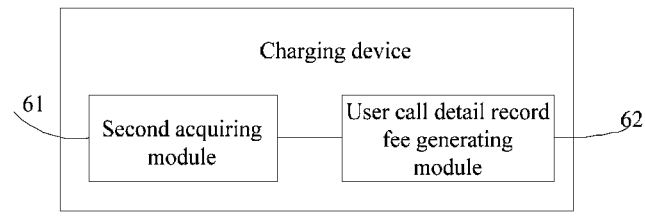
FIG. 6 is a schematic structural diagram of a charging device according to another embodiment of the present invention.

FIG. 6 is a schematic structural diagram of a charging device according to another embodiment of the present invention; as shown in FIG. 6, the device includes:

a second acquiring module 61, configured to acquire a public land mobile network PLMN identifier corresponding to a network name displayed by a user equipment carried in user call detail record information, according to the user call detail record information;

a user call detail record fee generating module 62, configured to generate a corresponding user call detail record fee, according to a charging rate of the PLMN identifier corresponding to the network name displayed by the user equipment, acquired by the second acquiring module.

In an optional implementation of this embodiment, the user call detail record information further includes a PLMN identifier of the current serving network;

the user call detail record fee generating module 62 is specifically configured to generate a corresponding user call detail record fee, according to a charging rate of the PLMN identifier of the current serving network, if a charging rate of the PLMN identifier corresponding to the network name displayed by the user equipment is determined to be greater than the charging rate of the PLMN identifier of the current serving network;

generate a corresponding user call detail record fee, according to a charging rate of the PLMN identifier corresponding to the network name displayed by the user equipment, if a charging rate of the PLMN identifier corresponding to the network name displayed by the user equipment is determined to be less than the charging rate of the PLMN identifier of the current serving network.

In an optional implementation of this embodiment, the user call detail record information further includes a PLMN identifier of a packet data network gateway PGW or a gateway general packet radio service support node GGSN;

the user call detail record fee generating module 62 is further specifically configured to perform inter-network fee settlement among a network of the PLMN identifier corresponding to the network name displayed by the user equipment, the current serving network and a network of the PLMN identifier of the PGW or the GGSN, according to the PLMN identifier corresponding to the network name displayed by the user equipment, the PLMN identifier of the current serving network and the PLMN identifier of the PGW or the GGSN. In the specific implementation, for example, a user's home operator (Home PLMN, HPLMN) can respectively pay an operator of the PLMN corresponding to the network name displayed by the user equipment, an operator of the current serving network and an operator of the PLMN of PGW or GGSN, or the user's home operator (HPLMN) pays the operator of the PLMN corresponding to the network name displayed by the user equipment, and then the operator of the PLMN corresponding to the network name displayed by the user equipment respectively pays the operator of the PLMN of the current serving network and the operator of the PLMN of PGW or GGSN.

The charging device in this embodiment can charge the UE, according to the PLMN identifier corresponding to the network name displayed by the UE, carried in the call detail record information, and charging the user can be achieved according to the network name displayed by the UE, thereby ensuring accuracy of the charging the user, and enhancing user experience.

Further, the charging device in this embodiment also can charge the user according to the charging rate of the current serving network based on the PLMN identifier of the current serving network carried in the call detail record information, if the charging rate of the current serving network is determined to be less than the charging rate of the network displayed by the UE, thereby achieving charging the user in a low charging rate and improving user experience;

Further, the charging device in this embodiment also can perform inter-network fee settlement among different network operators, according to the PLMN identifier corresponding to the network name displayed by the UE, the PLMN identifier of the current serving network and the PLMN identifier of PGW/GGSN, carried in the call detail record information, improving accuracy of the inter-network fee settlement among different network operators.

Another embodiment of the present invention provides a system for processing charging information, including the mobility management device in the apparatus embodiment with reference to FIG. 4, the call detail record information generating device in the apparatus embodiment with reference to FIG. 5 and the charging device in the apparatus embodiment with reference to FIG. 6.

Particularly, the details of the mobility management device can be referred to relevant contents in the embodiment with reference to FIG. 1, the details of the call detail record information generating device can be referred to relevant contents in the embodiment with reference to FIG. 2, the details of the charging device can be referred to relevant contents in the embodiment with reference to FIG. 3, and accordingly are not described further herein.

The mobility management device in embodiments of the present invention can acquire the PLMN identifier corresponding to the network name displayed by the UE, and transmit the PLMN identifier corresponding to the network name displayed by the UE to the call detail record information generating device, the call detail record information generating device can add the PLMN identifier corresponding to the network name displayed by the UE to the user call detail record information, and transmit the user call detail record information to the charging device, the charging device can charge the UE, according to the PLMN identifier corresponding to the network name displayed by the UE, and charging the user can be achieved according to the network name displayed by the UE, thereby ensuring accuracy of the charging the user, and enhancing user experience.

Persons skilled in the art can clearly know that, the above embodiment can be applied to interoperation between LTE and 1×RTT, such as 1×CSFB, 1×SRVCC.

Persons skilled in the art can clearly know that, for convenience and brevity of description, the detailed working procedures of the systems, devices, and units described above can be deduced effortlessly from the corresponding procedures in the method embodiments, and are not repeated herein.

Understandably, in the embodiments described herein, the disclosed systems, devices and methods may be implemented in other modes. For example, the device embodiments above are illustrative in nature, and the units of the device are divided from the perspective of logical functions only and may be divided in a different way in practical application. For example, multiple units or components may be combined or integrated into another system, or some features may be ignored or not executed. Besides, the coupling, direct coupling or communication connection illustrated or discussed herein may be implemented through indirect coupling or communication connection between interfaces, devices or units, and may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the present invention.

Besides, all functional units in the embodiments of the present invention may be physically stand-alone, or integrated into a processing module, or two or more of the units are integrated into one unit. The integrated unit above can be implemented in hardware, or a combination of hardware and software function units.

The integrated unit above implemented as a software function unit can be stored in a computer-readable storage medium. The software function unit above is stored in a storage medium and incorporates several instructions causing a computer device (for example, personal computer, server, or network device) to execute part of the steps of the method according to each embodiment of the present invention. Examples of the storage medium include various media capable of storing program codes, such as a USB flash disk, a mobile hard disk, a read-only memory (Read-Only Memory, ROM), a random access memory (Random Access Memory, RAM), a magnetic disk, or an optical disk.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from the spirit and scope of the embodiments of the present invention.

What is claimed is:

1. A method for processing charging information, comprising:
    acquiring, by a mobility management device, a public land mobile network (PLMN) identifier corresponding to a network name displayed by a user equipment; and
    transmitting the PLMN identifier corresponding to the network name displayed by the user equipment to a call detail record information generating device, wherein the PLMN identifier corresponding to the network name displayed by the user equipment is different from a PLMN identifier of a current serving node, so that user call detail record information, which is used for generating a corresponding user call detail record fee, generated by the call detail record information generating device comprises the PLMN identifier corresponding to the network name displayed by the user equipment.

2. The method according to claim 1, wherein the acquiring, by the mobility management device, the PLMN identifier corresponding to the network name displayed by the user equipment, comprises:
    determining the PLMN identifier carried in mobility management information transmitted to the user equipment as the PLMN identifier corresponding to the network name displayed by the user equipment; or
    determining, according to a network name configured by the user equipment, a PLMN identifier corresponding to the network name, and determining the PLMN identifier corresponding to the network name as the PLMN identifier corresponding to the network name displayed by the user equipment.

3. The method according to claim 1, wherein the call detail record information generating device comprises at least one of a mobile service switching center server (MSC Server), a serving general packet radio service support node (SGSN), a gateway general packet radio service support node (GGSN), a serving gateway (SGW), a packet data network gateway (PGW) or a mobility management entity (MME).

4. The method according to claim 1, wherein the mobility management device comprises at least one of a mobility management entity (MME) or a serving general packet radio service support node (SGSN).

5. A method for processing charging information, comprising:
    receiving, by a call detail record information generating device, a public land mobile network (PLMN) identifier corresponding to a network name displayed by a user equipment, wherein the PLMN identifier corresponding to the network name displayed by the user equipment is different from a PLMN identifier of a current serving node; and generating user call detail record information, which is used for generating a corresponding user call detail record fee, according to the PLMN identifier corresponding to the network name displayed by the user equipment, wherein the user call detail record information comprises the PLMN identifier corresponding to the network name displayed by the user equipment.

6. The method according to claim 5, wherein the receiving, by the call detail record information generating device, the PLMN identifier corresponding to the network name displayed by the user equipment, comprises:

receiving, by the call detail record information generating device, a request message comprising the PLMN identifier corresponding to the network name displayed by the user equipment, transmitted by a mobility management device.

7. The method according to claim 5, wherein the generating the user call detail record information, according to the PLMN identifier corresponding to the network name displayed by the user equipment, comprises:

generating, by the call detail record information generating device, user call detail record information comprising the PLMN identifier corresponding to the network name displayed by the user equipment, according to the PLMN identifier corresponding to the network name displayed by the user equipment.

8. A mobility management device, comprising:

a first acquiring module, configured to acquire a public land mobile network (PLMN) identifier corresponding to a network name displayed by a user equipment; and a transmitting module, configured to transmit the PLMN identifier corresponding to the network name displayed by the user equipment, acquired by the first acquiring module, to a call detail record information generating device wherein the PLMN identifier corresponding to the network name displayed by the user equipment is different from a PLMN identifier of a current serving node, so that user call detail record information, which is used for generating a corresponding user call detail record fee, generated by the call detail record information generating device comprises the PLMN identifier corresponding to the network name displayed by the user equipment.

9. The mobility management device according to claim 8, wherein the first acquiring module is configured to:

determine the PLMN identifier carried in mobility management information transmitted to the user equipment as the PLMN identifier corresponding to the network name displayed by the user equipment; or determine, according to a network name configured by the user equipment, a PLMN identifier corresponding to the network name, and determine the PLMN identifier corresponding to the network name as the PLMN identifier corresponding to the network name displayed by the user equipment.

10. A method for processing charging information, comprising:

acquiring a public land mobile network (PLMN) identifier corresponding to a network name displayed by a user equipment included in user call detail record information, according to the user call detail record information, wherein the PLMN identifier corresponding to the network name displayed by the user equipment is different from a PLMN identifier of a current serving node; and generating a corresponding user call detail record fee, according to a charging rate of the PLMN identifier corresponding to the network name displayed by the user equipment.

11. The method according to claim 10, wherein the user call detail record information further comprises a PLMN identifier of a current serving network;

wherein the method further comprises:

generating a corresponding user call detail record fee, according to a charging rate of the PLMN identifier of the current serving network, if the charging rate of the PLMN identifier corresponding to the network name displayed by the user equipment is determined to be greater than the charging rate of the PLMN identifier of the current serving network; or generating a corresponding user call detail record fee, according to the charging rate of the PLMN identifier corresponding to the network name displayed by the user equipment, if the charging rate of the PLMN identifier corresponding to the network name displayed by the user equipment is determined to be less than the charging rate of the PLMN identifier of the current serving network.

12. A charging device, comprising:

an acquiring module, configured to acquire a public land mobile network (PLMN) identifier corresponding to a network name displayed by a user equipment carried in user call detail record information, according to the user call detail record information, wherein the PLMN identifier corresponding to the network name displayed by the user equipment is different from a PLMN identifier of a current serving node; and a user call detail record fee generating module, configured to generate corresponding user call detail record fee, according to a charging rate of the PLMN identifier corresponding to the network name displayed by the user equipment, acquired by the acquiring module.

13. The charging device according to claim 12, wherein the user call detail record information further comprises a PLMN identifier of a current serving network;

wherein the user call detail record fee generating module is configured to:

generate the corresponding user call detail record fee, according to a charging rate of the PLMN identifier of the current serving network, if the charging rate of the PLMN identifier corresponding to the network name displayed by the user equipment is determined to be greater than the charging rate of the PLMN identifier of the current serving network;

generate the corresponding user call detail record fee, according to a charging rate of the PLMN identifier corresponding to the network name displayed by the user equipment, if the charging rate of the PLMN identifier corresponding to the network name displayed by the user equipment is determined to be less than the charging rate of the PLMN identifier of the current serving network.

* * * * *